US008023650B2

(12) United States Patent
Ohbitsu et al.

(10) Patent No.: US 8,023,650 B2
(45) Date of Patent: Sep. 20, 2011

(54) INFORMATION PROCESSING APPARATUS, SETUP METHOD AND NON-TRANSITORY COMPUTER-READABLE RECORDING MEDIUM ON WHICH SETUP PROGRAM IS RECORDED

(75) Inventors: Toshiro Ohbitsu, Kawasaki (JP); Hisamichi Higuchi, Kawasaki (JP); Masashi Urushihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 915 days.

(21) Appl. No.: 11/712,450

(22) Filed: Mar. 1, 2007

(65) Prior Publication Data

US 2007/0156596 A1    Jul. 5, 2007

Related U.S. Application Data

(63) Continuation of application No. PCT/JP2004/013442, filed on Sep. 15, 2004.

(51) Int. Cl.
*H04L 9/00* (2006.01)
(52) U.S. Cl. .............................. 380/46; 713/189; 713/193
(58) Field of Classification Search .................. 713/189, 713/193–194; 726/26–27, 31–33; 380/200–203, 380/46, 44; 705/57–59; 708/250, 254, 255, 708/270
See application file for complete search history.

(56) References Cited

U.S. PATENT DOCUMENTS

| | | | | | |
|---|---|---|---|---|---|
| 5,830,064 | A | * | 11/1998 | Bradish et al. | 463/22 |
| 6,144,743 | A | * | 11/2000 | Yamada et al. | 380/44 |
| 7,117,141 | B2 | * | 10/2006 | Kaji et al. | 703/21 |
| 2002/0152394 | A1 | | 10/2002 | Kadoya | 713/191 |
| 2003/0045979 | A1 | | 3/2003 | Ogasawara | 701/36 |
| 2003/0084316 | A1 | | 5/2003 | Schwartz | |
| 2004/0037288 | A1 | | 2/2004 | Bourgart et al. | |
| 2004/0098471 | A1 | | 5/2004 | Shima | |

FOREIGN PATENT DOCUMENTS

| | | |
|---|---|---|
| JP | 10-91425 | 4/1998 |
| JP | 11-212771 | 8/1999 |
| JP | 2003-5859 | 1/2003 |
| JP | 2003-78425 | 3/2003 |
| JP | 2003-196162 | 7/2003 |

(Continued)

OTHER PUBLICATIONS

"[Special Feature Article This Week] Great Special Issue on Recording Type DVD Drives; Those Ready for the Two-Layer Type or Those of the Multi-Layer Type Which Are Reasonably Priced, Not to Endure Any More?" Jun. 19, 2004. URL: http://ascii24.com/news/specials/article/2004/06/19/650184-002.html, p. 5 "DVD Writing Software" to p. 7, line 8.

(Continued)

*Primary Examiner* — Hosuk Song
(74) *Attorney, Agent, or Firm* — Staas & Halsey LLP (57) ABSTRACT

An information processing apparatus includes a detection section for detecting that the information processing apparatus is started for the first time, a selection section for selecting at least one kind of the setting information from among a plurality of kinds of the setting information where it is detected by the detection section that the information processing apparatus is started for the first time, and a processing section for performing an initial setting process for the information processing apparatus using the setting information selected by the selection section. Consequently, the necessity for a user to perform inputting of the setting information is eliminated thereby to enhance the convenience, and also the fabrication source can reduce the management cost for the setting information.

13 Claims, 5 Drawing Sheets

FOREIGN PATENT DOCUMENTS

| | | |
|---|---|---|
| JP | 2004-30601 | 1/2004 |
| JP | 2004-78392 | 3/2004 |
| JP | 2004-51152 | 4/2004 |
| JP | 2004-220317 | 8/2004 |
| WO | WO 02/30149 | 4/2002 |

OTHER PUBLICATIONS

"Digital AV News: Business World News—Cyberlink, Digital Broadcasting [Copy Control System] Briefing Session Held, in Which Also Matsushita, Warner, BS-I etc. take part]," Phile-Weber Editor, Jun. 17, 2004, p. 2, line 27 to line 35.

English language translation of second sheet of International Search Report (PCT/ISA/210) for International Application PCT/JP2004/013442.

Japanese Patent Office Action mailed Aug. 10, 2010 in corresponding Japanese Patent Application No. 2006-534984.

* cited by examiner

INFORMATION PROCESSING APPARATUS, SETUP METHOD AND NON-TRANSITORY COMPUTER-READABLE RECORDING MEDIUM ON WHICH SETUP PROGRAM IS RECORDED

This application is a continuation application, filed under 35 USC 111(a), of International Application PCT/JP2004/013442, filed Sep. 15, 2004, which is incorporated herein by reference.

TECHNICAL FIELD

This invention relates to a supplying method for setting information such as, for example, a device key in CPRM (Content Protection for Recordable Media).

BACKGROUND ART

In recent years, as a copyright protection technique in the DVD standards and so forth, for example, CPRM (Content Protection for Recordable Media) is known.

In media (DVD-RAM, DVD-RW and so forth) ready for such CPRM, all contents ready for CPRM are encrypted, and key information called MKB (Media Key Block) is recorded in the lead-in region of the medium and a medium ID which is unique ID information different for each medium is recorded in a region called BCA (Burst Cutting Area). It is to be noted that the MKB and the medium ID cannot be copied nor changed.

The MKB is issued by a licensing organization (for example, the 4C Entity, LLC), and the number of media which can be produced using one MKB is determined in advance. In particular, the MKB is updated every time a fixed number of media are fabricated, and a new MKB is issued by the licensing organization every time the production number of media exceeds the fixed number (for example, 5,000).

On the other hand, on a device side on which contents stored in the media are reproduced or contents are recorded on the media, a device key (equipment key) produced by the licensing organization in a corresponding relationship to the MKB is registered, and, in CPRM, decryption or encryption of a content is carried out to reproduce or record the content using the device key, MKB, medium ID and so forth.

For example, in CPRM, where a content recorded on a medium is reproduced using a device, the content is decrypted using a key produced using the device key, MKB and so forth.

Then, if the device key is penetrated by analysis or the like by any chance, then a new MKB is issued by the licensing organization so that the device key corresponding to the penetrated cryptographic key cannot be used. Consequently, illegal utilization of the content (medium) can be prevented.

Further, where a PC (Personal Computer) is ready for CPRM, software (application ready for CPRM) used for reproduction and recording of a medium corresponds to the device described above.

It is to be noted that, according to CPRM, a PC having a device key different from that of a PC on which a content (encrypted content) recorded on a medium is produced is used cannot perform a decryption process of the content.

Incidentally, according to a rule determined by the licensing organization described above, 5,000 device keys can be distributed in the maximum. On the ground of this, a software maker of applications ready for CPRM can take a method of fabricating 5,000 sets of packets with one device key applied thereto (refer to Non-Patent Document 1 hereinafter given).

In particular, as described above, since the number of media which can be fabricated using an MKB or a device key produced corresponding to the MKB is determined in advance by the licensing organization (for example, 5,000 media), for example, in order to fabricate fifty-hundred thousand PCs of the pre-installed model in which applications and an OS (Operating System) ready for CPRM are installed in advance, 500,000/5,000=1,000 kinds of device keys are acquired in advance from the licensing organization.

In a fabrication source of the PC, upon fabrication of PCs of a pre-installed model, a master hard disk which has a data configuration same as that of a hard disk of a PC to be shipped is prepared in advance and the master hard disk is successively copied to duplicate hard disks to be provided in PCs. However, preparation of master hard disks which individually correspond to many kinds of device keys in this manner is not desirable because an increased fabrication cost is required.

Therefore, in the conventional technique, upon shipment of such PCs of a pre-installed model as described above, a piece of paper on which one of 1,000 different device keys is printed is prepared and annexed to each PC wherein an application or an OS is installed on a hard disk thereof.

Then, if a user who bought the PC inputs the device key using a keyboard or the like while referring to the annexed paper upon first time starting of the PC, then the inputted device key is set to and registered into an application ready for CPRM, and as a result, a process such as reproduction, recording or the like can be performed for a medium described above.

However, such inputting working of the device key as described above is cumbersome to the user, and it is not convenient that, even if a PC is bought, the PC cannot be used immediately. Further, also to the trading source of the PC, it is necessary to manage the number of shipped PCs (that is, the number of shipped pieces of paper on which a device key is printed) and change, every time and the number of the shipment reaches the predetermined number, the paper to be annexed to a PC to different paper on which another device key is printed. Therefore, there is a subject that the trading source is urged to bear a burden of an increased cost required for management of the number of shipped pieces of paper on which a device key is printed.

The present invention has been made in view of such a subject as described above, and it is an object of the present invention to eliminate the necessity for a user to perform inputting of setting information to enhance the convenience and allow the trading source to decrease the management cost for setting information.

Non-Patent Document 1: "[Special feature article this week] Great special issue on recording type DVD drives; those ready for the two-layer type or those of the multi-layer type which are reasonably priced, not to endure any more!?", [online], Jun. 19, 2004, ascii24.com, [searched Sep. 9, 2004], Internet <URL:http://ascii24.com/news/specials/article/2004/06/19/6 50184-002.html>

DISCLOSURE OF INVENTION

In order to attain the object described above, according to the present invention, there is provided an information processing apparatus including a setup function for performing an initial setting process using setting information, comprising a detection section for detecting that the information processing apparatus is started for the first time, a selection section for selecting at least one kind of the setting information from among a plurality of kinds of the setting information where it is detected by the detection section that the information processing apparatus is started for the first time, and a processing section for performing an initial setting process for the information processing apparatus using the setting information selected by the selection section.

The information processing apparatus may be configured such that it further comprise a random number production section for producing a random number, and the selection section selects at least one kind of the setting information from among the plural kinds of the setting information using the random number produced by the random number production section. The information processing apparatus may further comprise a storage section for storing the plural kinds of the setting information.

Further, the information processing apparatus may be configured such that the setting information is key information regarding copyright protection of data, and the processing section sets, as the initial setting process, the data using the key information so that the data can be reproduced or recorded in the information processing apparatus.

According to the present invention, there is provided another information processing apparatus for performing a setting process using setting information, comprising a random number production section for producing a random number, a selection section for selecting at least one kind of the setting information from among a plurality of kinds of the setting information using the random number produced by the random number production section, and a processing section for performing the setting process using the setting information selected by the selection section.

The number of the plural kinds of the setting information may have a predetermined relationship to the prediction production number of apparatus of the same type as that of the information processing apparatus.

Further, according to the present invention, there is provided setup method for performing an initial setting process of an information processing apparatus using setting information, comprising a detection step of detecting that the information processing apparatus is started for the first time, a selection step of selecting at least one kind of the setting information from among a plurality of kinds of the setting information where it is detected at the detection step that the information processing apparatus is started for the first time, and a processing step of performing the initial setting process using the setting information selected by the selection section.

The setup method may be configured such that it further comprises a random number production step of producing a random number, and that, at the selection step, at least one kind of the setting information is selected from among the plural kinds of the setting information using the random number produced at the random number production step.

Further, the setup method may be configured such that the setting information is key information regarding copyright protection of data, and at the processing step, a setting process is performed as the initial setting process using the key information so that the data can be reproduced or recorded in the information processing apparatus.

Further, the number of the plural kinds of the setting information may have a predetermined relationship to the prediction production number of apparatus of the same type as that of the information processing apparatus.

Further, according to the present invention, there is provided a setup program for performing an initial setting process of a computer using setting information, the setup program causing the computer to function as a selection section for selecting at least one kind of the setting information from among a plurality of kinds of the setting information, and a processing section for performing the initial setting process using the setting information selected by the selection section.

The setup program may be configured such that the setup program causes the computer to function as a random number production section for producing a random number, and when the setup program causes the computer to function as the selection section, the setup program causes the computer to function so that at least one kind of the setting information is selected from among the plural kinds of the setting information using the random number produced by the random number production section.

Further, the setup program may be configured such that the setting information is key information regarding copyright protection of data, and when the setup program causes the computer to function as the processing section, a setting process is performed as the initial setting process using the key information so that the data can be reproduced or recorded in the information processing apparatus.

The number of the plural kinds of the setting information may have a predetermined relationship to the prediction production number of apparatus of the same type as that of the computer.

Further, according to the present invention, there is provided a computer-readable recording medium on which a setup program executed upon initial starting of a computer for performing an initial setting process of the computer using setting information is recorded, the setup program causing the computer to function as a selection section for selecting at least one kind of the setting information from among a plurality of kinds of the setting information, and a processing section for performing the initial setting process using the setting information selected by the selection section.

The computer-readable recording medium may be configured such that the setup program causes the computer to function as a random number production section for producing a random number and causes the computer to function so that the selection section selects at least one kind of the setting information from among the plural kinds of the setting information using the random number produced by the random number production section. Further, the plural kinds of the setting information may be stored.

Further, the computer-readable recording medium may be configured such that the setting information is key information regarding copyright protection of data, and when the setup program causes the computer to function as the processing section, a setting process is performed as the initial setting process using the key information so that the data can be reproduced or recorded in the computer. Further, the number of the plural kinds of the setting information may have a predetermined relationship to the prediction production number of apparatus of the same type as that of the computer.

Further, according to the present invention, there is provided an information processing apparatus, comprising a storage section for storing a plurality of kinds of setting information, a selection section for selecting at least one kind of the setting information from among the plural kinds of the setting information, and a processing section for performing a setting process for the information processing apparatus using the setting information selected by the selection section.

The information processing apparatus may be configured such that it further comprises a random number production section for producing a random number, and that the selection section selects at least one kind of the setting information from among the plural kinds of the setting information using the random number produced by the random number production section.

The information processing apparatus may be configured such that the setting information is key information regarding copyright protection of data, and the processing section sets, as the setting process, the data using the key information so that the data can be reproduced or recorded in the information processing apparatus. Further, the number of the plural kinds of the setting information may have a predetermined relationship to the prediction production number of apparatus of the same type as that of the information processing apparatus.

Further, according to the present invention, there is provided a program for performing a setting process of a computer, the program causing the computer to function as a selection section for selecting at least one kind of setting information from among a plurality of kinds of setting information stored in a storage section, and a processing section for performing the setting process for the computer using the setting information selected by the selection section.

The program may be configured such that the program causes the computer to function as a random number production section for producing a random number, and when the program causes the computer to function as the selection section, the program causes the computer to function so that at least one kind of the setting information is selected from among the plural kinds of the setting information using the random number produced by the random number production section.

Further, the program may be configured such that the setting information is key information regarding copyright protection of data, and when the program causes the computer to function as the processing section, a setting process is performed as the setting process using the key information so that the data can be reproduced or recorded in the computer. Further, the number of the plural kinds of the setting information may have a predetermined relationship to the prediction production number of apparatus of the same type as that of the computer.

According to the present invention, there is provided a computer-readable recording medium on which the program described above is recorded.

According to the present invention, the following effects or advantages are provided.

(1) Upon first time starting of the information processing apparatus, the user need not perform inputting working of setting information. Consequently, the convenience is high and the satisfaction degree of the customer can be enhanced.

(2) A piece of paper or the like on which a device key is printed need not be annexed upon shipment of the information processing apparatus. Consequently, the fabrication cost can be decreased.

(3) Also in a case wherein the fabrication number upon fabrication of information processing apparatus exceeds a fabrication permission number determined in advance, the information processing apparatus can be fabricated using one (common) master hard disk. Consequently, the fabrication cost can be decreased.

(4) Since one piece of setting information is selected from among a plurality of pieces of setting information using a produced random number, the plural pieces of setting information can be used equally among all information processing apparatus. Consequently, the management cost for the setting information can be decreased.

BEST MODE FOR CARRYING OUT THE INVENTION

In the following, an embodiment of the present invention is described with reference to the drawings.

Figure 1:
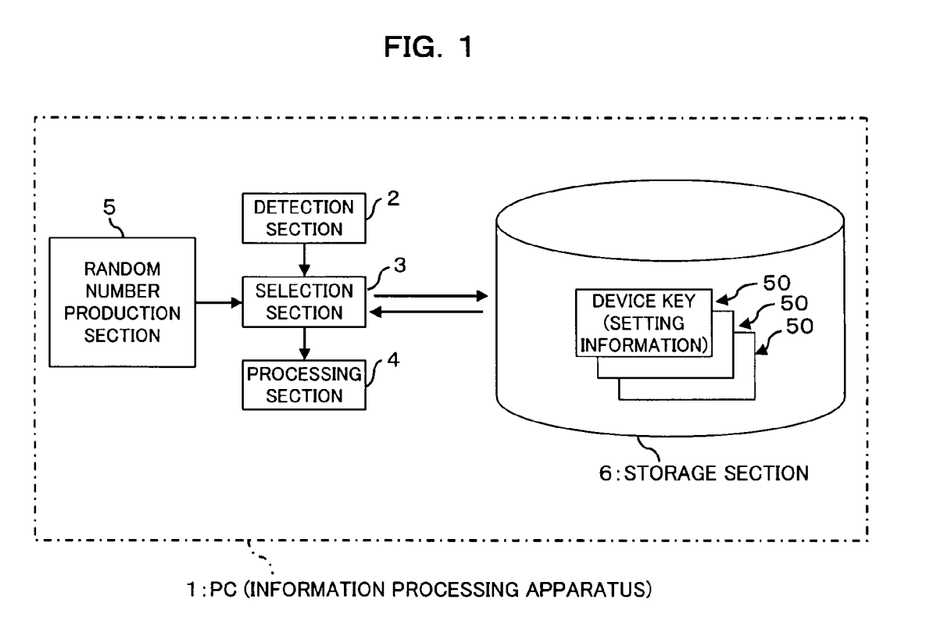
FIG. 1 is a block diagram showing a functional configuration of a PC as an embodiment of the present invention.

FIG. 1 is a block diagram showing a functional configuration of a PC (Personal Computer; information processing apparatus) as the embodiment of the present invention.

The PC 1 as the embodiment of the present invention is an information processing apparatus which can be ready for the CPRM (Content Protection for Recordable Media) and is configured as a PC of the pre-installed model in which an OS (Operating System) and various applications including applications ready for CPRM and so forth are installed in advance upon shipment from a factory.

As an example of an application ready for CPRM in the present embodiment, reproduction/recording software for performing reproduction and recording of various data from and on a medium (DVD-RAM, DVD-RW, SD card or the like) ready for CPRM is described below.

If a device key (setting information) acquired from a licensing organization (for example, the 4C Entity, LLC) is registered and set to an application ready for CPRM (reproduction/recording software), then the PC 1 can perform processes of reproduction, recording and so forth for a medium (DVD-RAM, DVD-RW, SD card or the like) ready for CPRM on which an MKB (Media Key Block) corresponding to the device key is recorded. It is to be noted that the device key functions as key information regarding copyright protection of data (content) stored on a medium.

Further, in a fabrication source of the PC 1, a number (for example, 1,000) of kinds of device keys equal to a number obtained by dividing a number of shipped PCs 1 (for example, 500,000), which is obtained by prediction in advance, by a fabrication permission number (for example, 5,000) per one MKB defined in CPRM are acquired in advance from the licensing organization.

And, as shown in FIG. 1, the PC 1 has functions as a detection section 2, a selection section 3, a random number production section 5, a processing section 4 and a storage section 6.

The detection section 2 detects that the PC 1 is started for the first time. It is to be noted that, in the present embodiment, the first time starting of the PC 1 includes not only a case wherein the PC 1 is started for the first time but also another case wherein the PC 1 is started for the first time after the OS or the like is re-installed, and includes not starting of the PC 1 but first time starting of an application ready for CPRM. Further, a case wherein an application ready for CPRM handles a content ready for CPRM for the first time may be included.

The storage section 6 stores a plurality of kinds of device keys 50. In the present embodiment, all of the device keys 50 (in the example described above, 1,000 keys) acquired from the licensing organization are stored. Further, in the storage section 6, the device keys 50 are stored as encrypted modules (file group).

The random number production section 5 produces a random number, and the selection section 3 selects at least one device key 50 from among the plural kinds of the device keys 50 stored in the storage section 6 where it is detected by the detection section 2 that the PC 1 is started for the first time. Then, upon such selection of a device key 50, the selection section 3 randomly selects one device key 50 from among the plural kinds of the device keys 50 stored in the storage section 6 using the random number produced by the random number production section 5. It is to be noted that the random number production section 5 controls an upper limit value to the random number to be produced so as to not exceed the value of the predicted number of shipment described above. Since the control of the value of the random number is a known technique, detailed description thereof is omitted.

In the present embodiment, the selection section 3 in the PC 1 randomly selects at least one device key 50 from among the plural kinds of the device keys 50 stored in the storage section 6 using a random number so that all of the device keys 50 acquired from the licensing organization are randomly and equally selected and used. Since the random number is an averaged definition, such a situation that only one device key 50 is used does not occur. Accordingly, if the number of shipped PCs 1 is predicted and an appropriate number of the device keys 50 are acquired, then the limitation to the fabrication number between the fabrication source and the licensing organization which provides the device keys 50 is not violated at all. Further, the uniformity regarding the selection of the device keys 50 enhances as the number of shipped PCs 1 increases.

Further, if the predicted number of shipment of the PC 1 is set rather great and the acquisition number of the device keys 50 is calculated when the device keys 50 are to be acquired from the licensing organization, then even if a bias should appear upon selection of the device keys 50 using the random number, it can be prevented that the number of the device keys 50 to be actually installed into the PCs 1 exceeds the fabrication permission number per one MKB defined by CPRM.

The processing section 4 performs an initial setting process for the PC 1 using a device key 50 selected by the selection section 3, and, in the present embodiment, as the initial setting process, a setting process is performed using the device key 50 so that a medium ready for CPRM can be reproduced and recorded on the PC 1.

Figure 2:
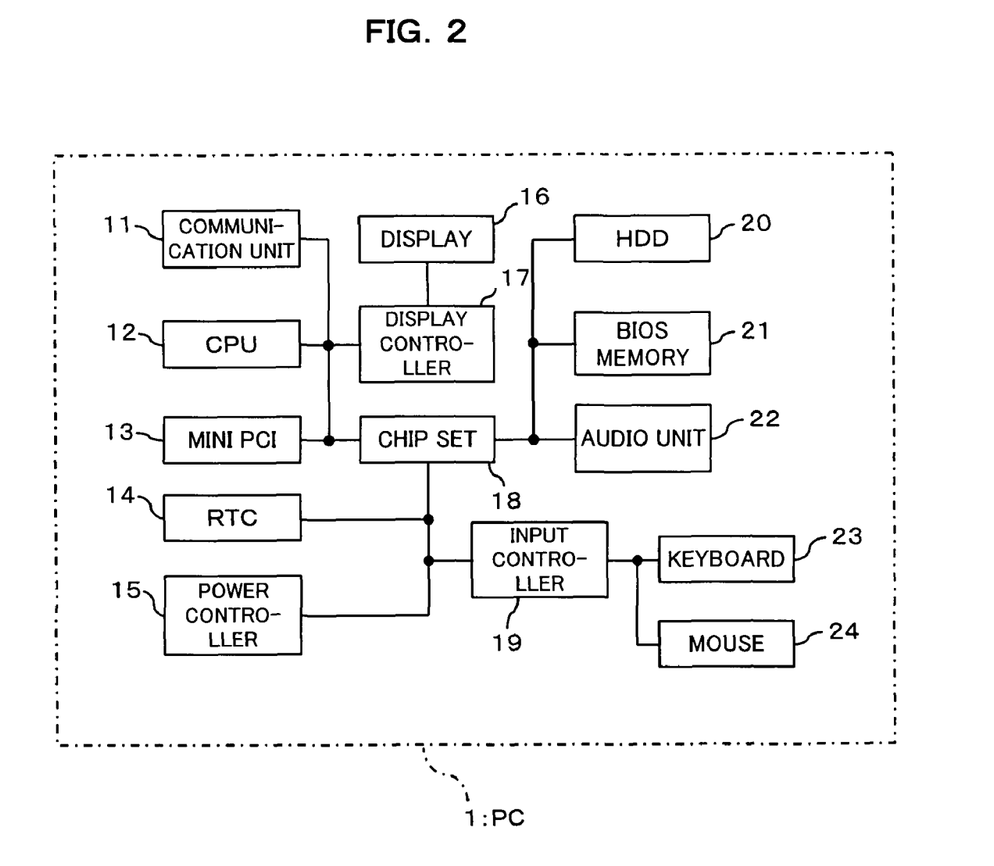
FIG. 2 is a view showing an example of a hardware configuration of the PC as the embodiment of the present invention.

FIG. 2 is a view showing an example of a hardware configuration of the PC as the embodiment of the present invention. As shown in FIG. 2, the PC 1 includes a communication unit 11, a CPU 12, a mini PCI 13, an RTC 14, a power controller 15, a display unit 16, a display controller 17, a chipset 18, an input controller 19, an HDD (Hard Disk Drive) 20, a BIOS memory 21, an audio unit 22, a keyboard 23, and a mouse 24.

The communication unit 11 is provided for making communication between the PC 1 and an external apparatus possible, and is configured, for example, from a LAN (Local Area Network) card or a modem.

The HDD 20 stores an OS and various applications, and, in the present embodiment, further stores all device keys 50 acquired from the licensing organization and functions as the storage section 6 described above.

The mini PCI 13 is a compact type extension card which utilizes a PCI bus (Peripheral Components Interconnect bus), and, in the present PC 1, an extension card having various functions such as a network card, a graphics card and so forth can be attached as occasion demands.

The RTC (Real Time Clock) 14 is a chip for exclusive use for time counting, and provides date and time to the OS, for example, upon starting and so forth of the present PC 1. It is to be noted that the RTC 14 operates while receiving power supply from a built-in battery also while the power supply to the present PC 1 is off.

The chipset (Chipset) 18 is a series of circuit groups for managing transfer of various data in the PC 1, and performs various processes such as, for example, data communication control of the CPU 12, memory and PCI slot and so forth. The chipset 18 is composed of a plurality of LSI (Large Scale Integration) circuits for a memory controller, a bus controller and so forth.

The power controller 15 performs control for supplying appropriate power to the chipset 18 and so forth.

The BIOS memory 21 is a memory for storing the BIOS (Basic Input/Output System), and is configured, for example, from a ROM (Read Only Memory).

The audio unit 22 provides an acoustic function and is configured, for example, from a sound card.

The keyboard 23 and mouse 24 are provided to receive inputting operation by the operator (user) of the present PC 1, and the input controller 19 performs control of input signals from the keyboard 23 and mouse 24.

The display unit 16 displays and provides various kinds of information to the operator, and the display controller 17 performs display control of the display unit 16.

The CPU (Central Processing Unit) 12 executes and processes various programs stored in the HDD 20 and the memory (not shown) to implement various functions. Then, in the present embodiment, as the CPU 12 of the PC1 executes the setup program, the CPU 12 functions as the detection section 2, selection section 3, random number production section 5 and processing section 4.

The setup program performs the initial setting process for the PC 1 and is executed, for example, when the user who has bought the PC 1 starts (switches on power supply to) the PC 1 for the first time in a state wherein it was shipped from a factory (first time starting). Then, the setup program performs processes such as opening and setting of the OS and various applications, deletion of unnecessary data generated by the initial setting process and so forth so that the PC 1 is set to a state wherein the user can utilize the PC 1.

It is to be noted that the setup program is executed not only in a case wherein the user returns the state of the PC 1 to that upon factory shipment by re-installing the setup program using a medium for recovery (medium for re-installation; a flexible disk, a CD or the like) annexed to the PC 1 but also in another case wherein the PC 1 is started (the power supply is switched on) for the first time after re-formatting.

It is to be noted that the program (setup program) for implementing the functions as the detection section 2, selection section 3, random number production section 5 and processing section 4 is provided in a form wherein the program is recorded on a computer-readable recording medium such as, for example, a flexible disk, a CD (CD-ROM, CD-R, CD-RW or the like), a DVD (DVD-ROM, DVD-RAM, DVD-R, DVD-RW, DVD+RW or the like), a magnetic disk, an optical disk, or a magneto-optical disk. Then, the PC (computer) 1 reads the program from the recording medium, transfers and stores the program to and into an internal storage apparatus or an external storage apparatus and uses the program. Further, the program may be recorded on a storage apparatus (recording medium) such as, for example, a magnetic disk, an optical disk, or a magneto-optical disk, and may be provided from the storage apparatus to the computer through a communication path.

When the functions as the detection section 2, selection section 3, random number production section 5 and processing section 4 are implemented, a program stored in an internal storage apparatus (in the present embodiment, the HDD 20 or a RAM or a ROM not shown) is executed by a microprocessor (in the present embodiment, the CPU 12) of the computer. At this time, the program recorded on a recording medium may be read out and executed by the computer.

It is to be noted that, in the present embodiment, the functions and processes as the detection section 2, selection section 3, random number production section 5, processing section 4 and storage section 6 described hereinabove are performed in a CPRM setting routine which forms part of the setup program.

Figure 3:
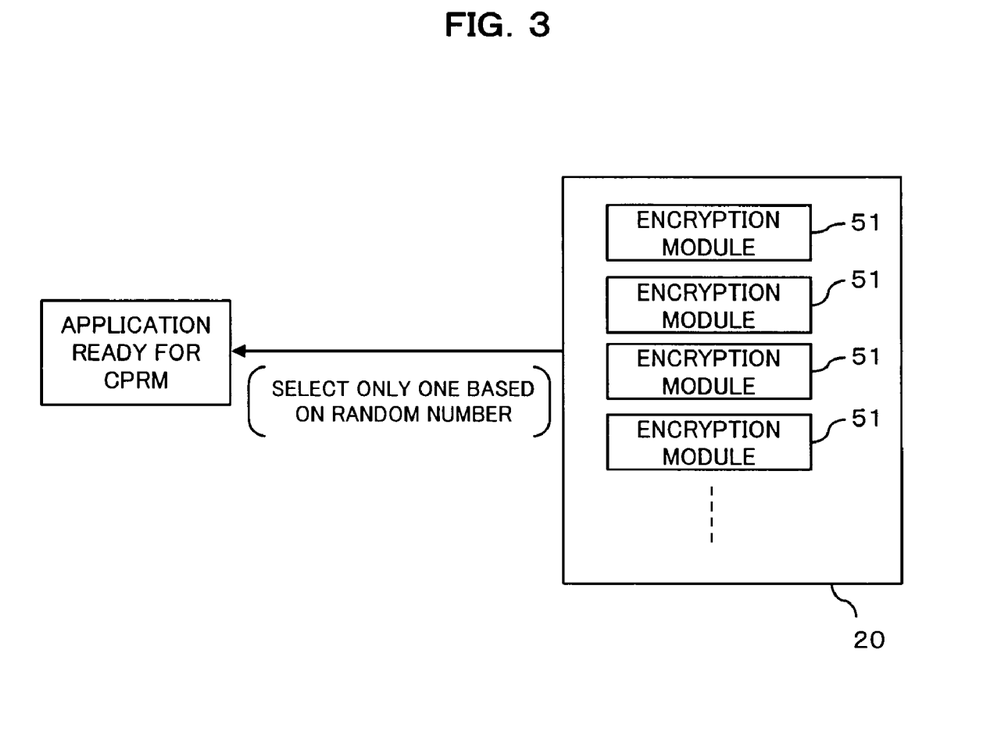
FIG. 3 is a view schematically showing a function of a setup program in the PC as the embodiment of the present invention.

FIG. 3 is a view schematically showing the functions of the setup program in the PC 1 as the embodiment of the present invention.

As shown in FIG. 3, the device keys 50 are each stored as a module in an encrypted form in the HDD 20. It is to be noted that a module 51 in an encrypted form is hereinafter referred to sometimes as encrypted module.

In the fabrication source of the PC 1, a master hard disk (not shown) having a data configuration (disk image) similar to that of the HDD 20 is prepared, and the master hard disk is copied to fabricate an HDD 20. In particular, the computer-readable recording medium of the present invention on which the setup program is recorded includes the master hard disk. It is to be noted that the master hard disk and the HDD 20 merely store the encrypted modules 51, and, only if the master hard disk or the HDD 20 is opened, the functions which use the modules cannot be used.

Further, a unique identification number is set in advance individually to each of the encrypted modules 51 stored in the HDD 20 and the master hard disk, and the random number to be produced by the random number production section 5 is produced within a range of the number of the encrypted modules 51 and the produced random number corresponds to (or coincides with) one of the identification numbers of the encrypted modules 51.

Then, the setup program cooperates with the OS (basic OS) to randomly select one encrypted module 51 using the random number from among the plurality of the encrypted modules 51 stored in the HDD 20.

Further, the setup program can decrypt the encrypted modules 51, and performs decryption of the selected encrypted module 51 and further performs additional installing of the decrypted module into the application ready for CPRM installed in advance in the PC 1 thereby to perform setting of the device key 50 to the application ready for CPRM.

Consequently, the application ready for CPRM can process (reproduce and so forth) contents (for example, music data, image data, or video data) recorded, for example, on a medium ready for CPRM or can record contents on the medium ready for CPRM.

It is to be noted that, in the present embodiment, the term computer represents a concept including hardware and an operating system (OS) and signifies hardware which operates under the control of the operating system. Further, where hardware is operated only by an application program without the necessity for use of the operating system, the hardware itself corresponds to the computer. The hardware includes at least a microprocessor such as a CPU and means for reading a computer program recorded on a recording medium, and, in the present embodiment, the PC 1 has functions as the computer.

Further, as a recording medium in the present embodiment, not only a flexible disk, a CD (CD-ROM, CD-R, CD-RW and so forth), a DVD (DVD-ROM, DVD-RAM, DVD-R, DVD-RW, DVD+RW and so forth), a magnetic disk, an optical disk, and a magneto-optical disk mentioned hereinabove but also an IC card, a ROM cartridge, a magnetic tape, a punched card, an internal storage apparatus (memory such as a RAM or a ROM) of the computer, an external storage apparatus, and various computer-readable media such as a printed matter on which a code such as a barcode is printed can be utilized.

An example of a setup process for the PC 1 as the embodiment of the present invention having the configuration described above is described with reference to a flow chart (steps A10 to A230) shown in FIG. 4.

It is to be noted that, in the example described below, the setup program urges the user to perform starting of a setting application, and the started setting application calls the CPRM setting routine.

If the user (buyer) which has bought the PC 1 initially starts (switches on power supply to) the PC 1 in a state upon factory shipment (first time starting), then it is detected by a BIOS or the like that the PC 1 is started for the first time (detection step). Further, in the PC 1, the setup program is executed and the OS and so forth are opened by the setup program, and an inputting instruction (massage) to urge the user to perform inputting of information necessary for starting of the PC 1 is displayed on the display unit 16. The user would perform inputting of the necessary information using the keyboard 23 and/or the mouse 24 in accordance with the inputting instruction displayed on the display unit 16 (step A10). The inputting of the necessary information is an inputting process relating to an OS environment and is performed similarly in all of a plurality of PCs 1.

If the inputting is completed, then the PC 1 starts normally (step A20), and the setup program causes the display unit 16 to display a massage for urging the user to perform unique setting (step A30). If the user manually starts the setting application in accordance with the massage (step A40), then the started setting application performs individual processes relating to initial setting of the PC 1 (step A50). Further, the setting application calls the CPRM setting routine (step A60).

In the CPRM setting routine, it is first confirmed whether or not a regular application ready for CPRM to be used as a base of the PC 1 in operation exists (step A70). If it is confirmed as a result of the confirmation of whether or not a regular application ready for CPRM exists (step A80) that a regular application (regular article) exists (refer to a YES route of the step A80), then the setting application recognizes the number of encrypted modules 51 (device keys 50) stored in the HDD 20 (step A90), and decides whether or not all of the encrypted modules 51 stored in the HDD 20 may be additionally installed into the version of the application installed in advance in the PC 1 (step A100).

If it is decided as a result of the decision of whether or not additional installation may be performed (step A110) that additional installation may be performed (refer to a YES route of the step A110), then the setting application performs discrimination of the model of the PC 1 and selects those of the encrypted modules (file groups) 51 which conforms to the discriminated model of the PC 1 (step A120).

Then, the CPRM setting routine (random number production section 5) generates a number of random numbers within the range of the number of the encrypted modules 51 which can be additionally installed and which are selected at step A120 (step A130; random number production step), and only those of the encrypted modules 51 corresponding to the number of produced random numbers (selection step) and decryption is performed (step A140).

The setup program installs the decrypted modules into the PC 1 (step A150; processing step) and issues a notification that installation is completed normally and the modules are made ready for CPRM to the application ready for CPRM (reproduction/recording software) (step A160).

The CPRM setting routine deletes those encrypted modules 51 other than the decrypted modules, that is, those encrypted modules 51 which are not selected, from the PC 1 (step A170), and confirms whether or not the deletion is completed normally (A180).

If the deletion is completed normally (refer to a YES route of the step A180), then it is displayed on the display unit 16 that the PC 1 is made ready for CPRM (step A200) and the CPRM setting routine is ended (step A210). Then, the processing returns to the setting application (step A220) and the processing of the entire setting application is ended (step A230).

It is to be noted that, after the processing, if the power supply to the PC 1 is switched on, then normal starting is performed without executing the setup program.

On the other hand, if the deletion is not completed normally (refer to a NO route of the step A180), then all of the applications ready for CPRM (basic applications) are deleted (step A190), and the processing advances to step A220.

Further, also when it is confirmed as a result of the confirmation of whether or not a regular application ready for CPRM exists that a regular article does not exist (refer to a NO route of the step AB0) and when it is decided as a result of the decision of whether or not additional installation can be performed that additional installation cannot be performed (refer to a NO route of the step A110), the processing advances to step A220.

Incidentally, in the fabrication source (or trading source) of the PC 1, it is preferable to manage (grasp) which device keys 50 (modules) are installed and used in the PC 1 used by the user.

The present PC 1 includes a program (updating application) for issuing a notification of the types of the device keys 50 (modules) actually installed in the PC 1. For example, in a case wherein the user established connection to a Web site of the fabrication source (or trading source) of the present PC 1 using the PC 1, the updating application is executed by the CPU 12 and a notification of the types of the device keys 50 (modules) actually installed in the PC 1 is issued to a server or the like of the fabrication source (or trading source).

Figure 5:
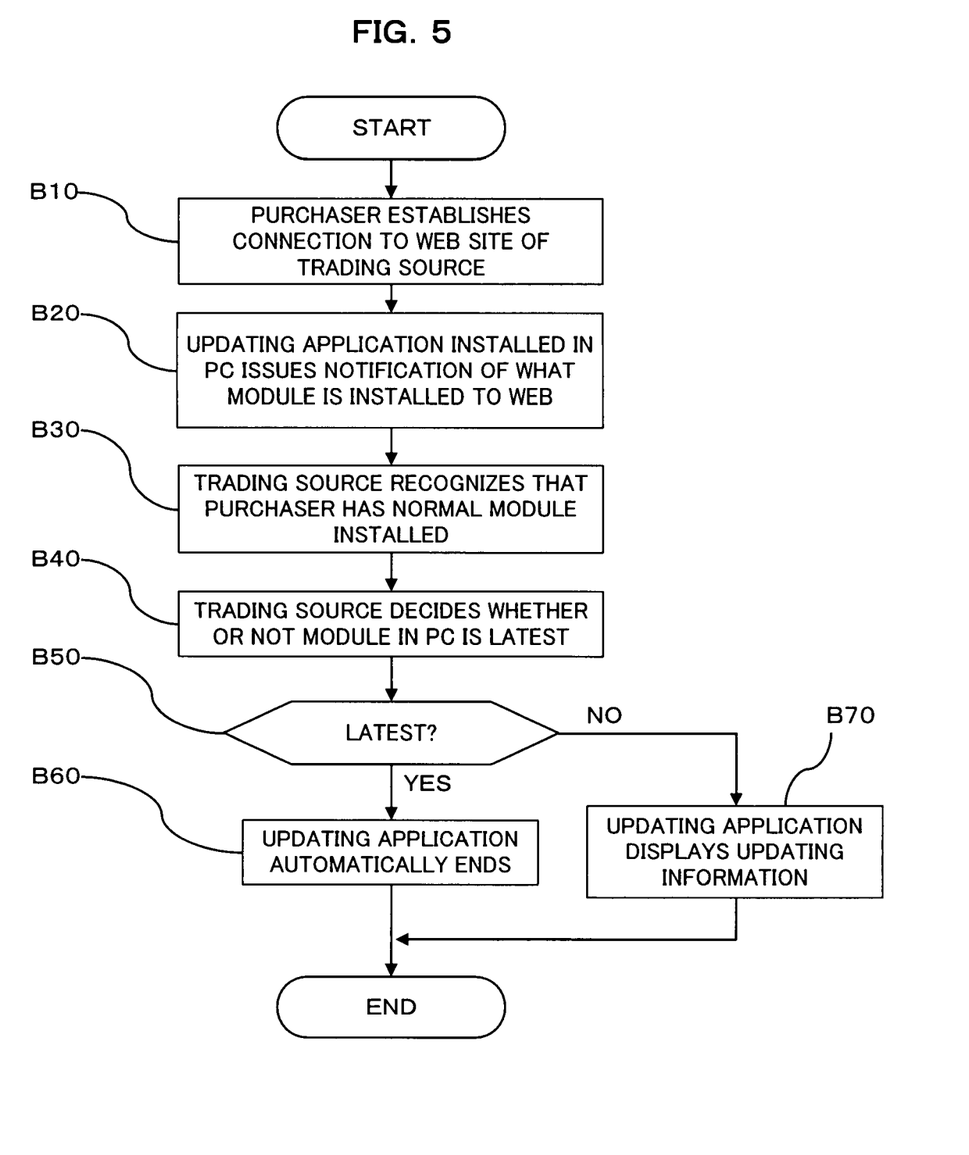
FIG. 5 is a flow chart illustrating a method of collecting information of a device key (module) used in the PC as the embodiment of the present invention.

A method for collecting information of the device keys 50 (modules) used in the PC 1 as the embodiment of the present invention is described with reference to a flow chart (steps B10 to B70) shown in FIG. 5.

If the user establishes connection to a website of the fabrication source (or trading source) of the PC 1 using the PC 1 (step B10), then in the PC 1, the updating application issues a notification of what modules (device keys 50) are installed in the PC 1 to the server of the website (step B20).

In the server of the fabrication source (or trading source), it is confirmed that the user installs normal modules in the PC 1 (step B30), and it is decided whether or not the modules installed in the PC 1 are the latest modules (step B40).

If it is decided as a result of the decision of whether or not the modules are the latest modules (step B50) that the modules are the latest modules (refer to a YES route of the step B50), then the updating application automatically ends (step B60). On the other hand, if it is decided that the modules are not the latest modules (refer to a NO route of the step B50), then the updating application causes, for example, information urging the user to update the modules (device keys 50) to be displayed on the display unit 16 (step B70). The user would update the modules in accordance with the information displayed on the display unit 16.

In this manner, with the PC 1 as the embodiment of the present invention, since the user which has bought the PC 1 need not perform inputting working of the device keys 50 upon first time starting of the PC 1, the convenience is high and the satisfaction degree of the customer can be enhanced.

Further, also in the fabrication source of the PC 1, since a piece of paper or the like on which a device key is printed need not be annexed upon shipment of the PC 1, the fabrication cost can be decreased. Further, also in a case wherein the fabrication number of PCs 1 exceeds the fabrication permission number (for example, 5,000) of media per one MKB prescribed by CPRM upon fabrication of PCs 1, the PCs 1 can be fabricated using one (common) master hard disk, and the fabrication cost can be decreased also by this.

Further, since one device key 50 is selected from among the plural device keys 50 (modules) using a produced random number, the plural device keys 50 can be used equally among all of the shipped PCs 1. Consequently, the management of the shipment number of the device keys 50 can be eliminated in the fabrication source (trading source) of the PCs 1, and the management cost therefor can be decreased.

It is to be noted that, upon re-installation in the PC 1, since the device keys 50 (modules) installed in the PC 1 are deleted once, the number of the device keys 50 which appear on the market can be kept fixed and the fabrication number restriction between the fabrication source and the licensing organization which provides the device keys 50 is not violated.

Further, the present invention is not limited to the embodiment specifically described above, but variations and modifications can be made without departing from the scope of the present invention.

For example, while, in the embodiment described above, the HDD 20 provided in the PC 1 functions as the storage section 6 for storing the plural device keys 50, the storage section 6 is not limited to this, but the function as the storage section 6 may be provided to various recording media (for example, a flexible disk, a CD (CD-ROM, CD-R, CD-RW or the like), a DVD (DVD-ROM, DVD-RAM, DVD-R, DVD-RW, DVD+RW or the like), a magnetic disk, an optical disk, a magneto-optical disk, an IC card, a ROM cartridge, a magnetic tape, and a memory such as a RAM, a ROM or the like) built in or connected for communication to the PC 1 by storing at least part of the plural device keys 50 into the recording medium.

Further, in the embodiment described above, the setup program urges the user to start the setting application and the started setting application performs calling of the CPRM setting routine, and then the functions and processes as the detection section 2, selection section 3, random number production section 5, processing section 4 and storage section 6 described above are implemented in the CPRM setting routine. However, the execution of the CPRM routine is not limited to this, but the setup program may directly execute CPRM setting routine.

Further, while, in the embodiment described above, one encrypted module 51 is selected using a random number from among the plural encrypted modules (device keys 50) stored in the HDD 20, the selection of an encrypted module 51 is not limited to this.

For example, a serial number may be set to all of the fabricated PCs 1 such that the setup program acquires the serial number and performs selection of one encrypted module 51 in accordance with a predetermined rule based on the serial number. In particular, a coordination table between the serial numbers and the encrypted modules may be prepared in advance such that selection of one encrypted module 51 is performed in accordance with the coordination table.

Further, selection of one encrypted module 51 may be performed using such an expression that one encrypted module 51 is selected equally from among the plural encrypted modules 51 (device keys 50) stored in the HDD 20 in place of a random number.

Further, while, in the embodiment described hereinabove, the setup program calls and executes the setting routine ready for CPRM, the CPRM setting routine may be incorporated in an application ready for CPRM such that the CPRM setting routine is executed upon first time starting of the application ready for CPRM or upon initial handling of a content ready for CPRM.

Further, while, in the present embodiment, the case is described wherein the PC 1 is of the pre-installed model in which an OS, various applications and so forth are installed in advance upon shipment from a factory, the present invention is not limited to this. The present invention can be applied also to a PC which is soled in such a form that a portable type recording medium such as a CD, a DVD or the like in which an OS and various applications are stored in advance is annexed to and sold together with a PC to the user and the user installs the OS and applications into the PC using the recording medium. In this instance, the substance of a master disk is stored in the portable type recording medium in a predetermined form so that the substance installed becomes same as the substance of the master disk when the substance is installed into the PC, and is set up to the PC by the setup program.

Figure 4:
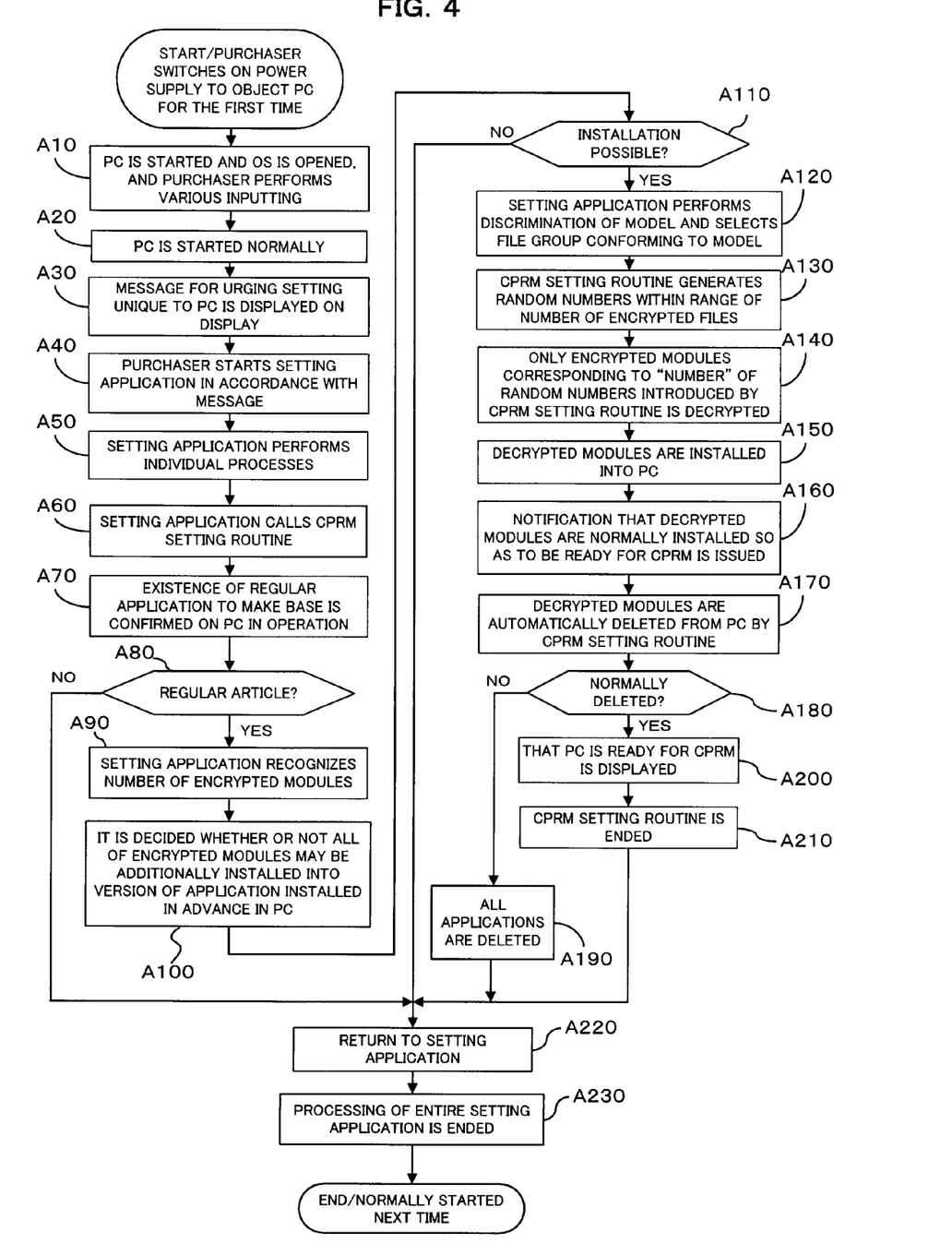
FIG. 4 is a flow chart illustrating an example of a setup process in the PC as the embodiment of the present invention.

Further, in the embodiment described above, when the encrypted modules 51 which are not selected are deleted from the PC 1 and, when the deletion is not completed normally, all of those applications which are ready for CPRM (basic applications) are deleted in the flow chart (step A170, A180) shown in FIG. 4. However, the process for such applications ready for CPRM is not limited to this, but the applications ready for CPRM may be set to a disabled state in place of being deleted.

Further, while, in the embodiment described above, one device key 50 is selected from a plurality of kinds of the device keys 50 and initial setting of the PC 1 is performed using the selected device key 50, the selection is not limited to this, but, for example, two or more device keys 50 may be selected and used.

Further, while, in the embodiment described above, the initial setting process in the PC 1 ready for CPRM is described, the present invention is not limited to this, but can be applied also to a copyright protection technique such as CPPM (Content Protection for Prerecorded Media) and so forth and various processes which selectively use and execute at least one of data from among a plurality of kinds of data.

It is to be noted that, if the embodiment of the present invention is disclosed, then the present invention can be carried out and fabricated by those skilled in the art.

INDUSTRIAL APPLICABILITY OF THE INVENTION

The present invention can be applied also to a copyright protection technique such as CPPM (Content Protection for Prerecorded Media) and so forth and besides can be applied also to uses wherein an application whose installation number is restricted is installed into a plurality of computers.

What is claimed:

1. An information processing apparatus including a setup function for performing an initial setting process using setting information, comprising:
   a detection section detecting that the information processing apparatus is started for the first time;
   a selection section selecting at least one kind of the setting information from among a plurality of kinds of the setting information where it is detected by said detection section that said information processing apparatus is started for the first time;
   a processing section performing an initial setting process for said information processing apparatus using the setting information selected by said selection section; and
   a random number production section producing a random number,
   wherein said selection section selects at least one kind of the setting information from among the plural kinds of the setting information using the random number produced by said random number production section,
   the setting information is key information regarding copyright protection of data, and
   said processing section sets, as the initial setting process, the data using the key information so that the data can be reproduced or recorded in said information processing apparatus.

2. The information processing apparatus as set forth in claim 1, further comprising a storage section storing the plural kinds of the setting information.

3. The information processing apparatus as set forth in claim 1, wherein the number of the plural kinds of the setting information has a predetermined relationship to the prediction production number of apparatus of the same type as that of said information processing apparatus.

4. An information processing apparatus for performing a setting process using setting information, comprising:
   a random number production section producing a random number when said information processing apparatus is started for the first time;
   a selection section selecting at least one kind of the setting information from among a plurality of kinds of the setting information using the random number produced by said random number production section; and
   a processing section performing the setting process using the setting information selected by said selection section,
   wherein the setting information is key information regarding copyright protection of data, and
   said processing section sets, as the initial setting process, the data using the key information so that the data can be reproduced or recorded in said information processing apparatus.

5. A setup method for performing an initial setting process of an information processing apparatus using setting information, comprising:
   detecting that said information process apparatus is started for the first time;
   selecting at least one kind of the setting information from among a plurality of kinds of the setting information where it is detected at the detecting that the information processing apparatus is started for the first time;
   performing the initial setting process using the setting information selected by the selecting; and
   producing a random number,
   wherein at the selecting, at least one kind of the setting information is selected from among the plural kinds of the setting information using the random number, the setting information is key information regarding copyright protection of data, and at the performing, a setting process is performed as the initial setting process using the key information so that the data can be reproduced or recorded in the information processing apparatus.

6. The setup method as set forth in claim 5, wherein the number of the plural kinds of the setting information has a predetermined relationship to the prediction production number of apparatus of the same type as that of the information processing apparatus.

7. A non-transitory computer-readable recording medium on which a setup program executed upon initial starting of a computer for performing an initial setting process of the computer using setting information is recorded, the setup program causing the computer to function as:

a selection section selecting at least one kind of the setting information from among a plurality of kinds of the setting information;

a processing section performing the initial setting process using the setting information selected by said selection section; and a random number production section producing a random number, wherein the setup program causes the computer to function so that said selection section selects at least one kind of the setting information from among the plural kinds of the setting information using the random number produced by said random number production section, the setting information is key information regarding copyright protection of data, and when the setup program causes the computer to function as said processing section, a setting process is performed as the initial setting process using the key information so that the data can be reproduced or recorded in the computer.

8. The non-transitory computer-readable recording medium on which a setup program is recorded as set forth in claim 7, wherein the plural kinds of the setting information are stored.

9. The non-transitory computer-readable recording medium on which a setup program is recorded as set forth in claim 7, wherein the number of the plural kinds of the setting information has a predetermined relationship to the prediction production number of apparatus of the same type as that of the computer.

10. An information processing apparatus, comprising:

a storage section storing a plurality of kinds of setting information;

a selection section selecting at least one kind of the setting information from among the plural kinds of the setting information, the number of the plural kinds of the setting information having a predetermined relationship to the prediction production number of apparatus of the same type as that of said information processing apparatus; and a processing section performing a setting process for said information processing apparatus using the setting information selected by said selection section, wherein the setting information is key information regarding copyright protection of data, and said processing section sets, as the setting process, the data using the key information so that the data can be reproduced or recorded in said information processing apparatus.

11. The information processing apparatus as set forth in claim 10, further comprising a random number production section producing a random number; and wherein said selection section selects at least one kind of the setting information from among the plural kinds of the setting information using the random number produced by said random number production section.

12. A non-transitory computer-readable recording medium on which a program for performing a setting process of a computer is recorded, the program causing the computer to function as:

a selection section selecting at least one kind of setting information from among a plurality of kinds of setting information stored in a storage section, the number of the plural kinds of the setting information having a predetermined relationship to the prediction production number of apparatus of the same type as that of the computer; and a processing section performing the setting process for the computer using the setting information selected by said selection section, wherein the setting information is key information regarding copyright protection of data, and when the program causes the computer to function as said processing section, the data is set, as the setting process, using the key information so that the data can be reproduced or recorded in the computer.

13. The non-transitory computer-readable recording medium on which a program is recorded as set forth in claim 12, wherein the program causing the computer to function as:

a random number production section producing a random number; and wherein when the program causes the computer to function as said selection section, the program causes the computer to function so that at least one kind of the setting information is selected from among the plural kinds of the setting information using the random number produced by said random number production section.

* * * * *